No. 611,012. Patented Sept. 20, 1898.
V. JEANTY.
ELECTRIC BATTERY.
(Application filed Oct. 21, 1897.)
(No Model.)
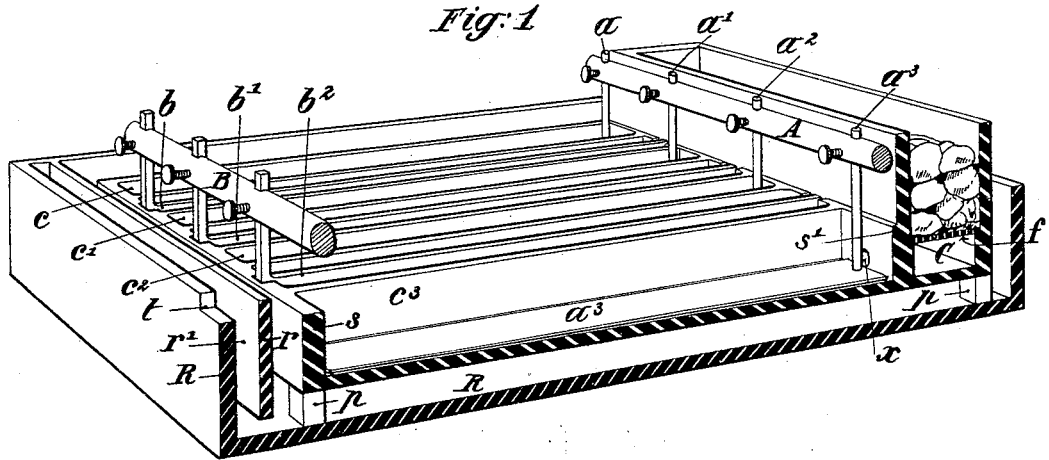
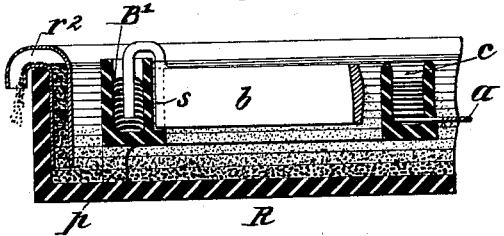
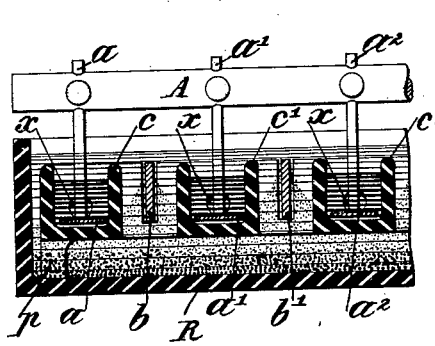
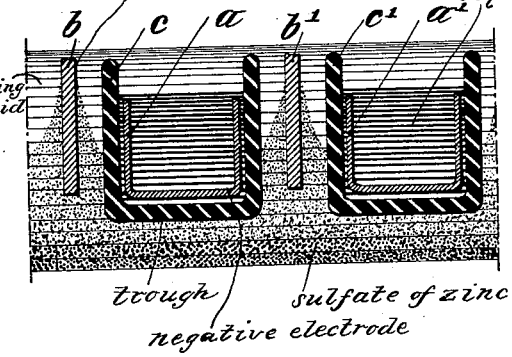
WITNESSES:
Inventor:
V. Jeanty
By
Attorneys.

UNITED STATES PATENT OFFICE.

VICTOR JEANTY, OF PARIS, FRANCE.

ELECTRIC BATTERY.

SPECIFICATION forming part of Letters Patent No. 611,012, dated September 20, 1898.

Application filed October 21, 1897. Serial No. 655,954. (No model.) Patented in France November 19, 1896, No. 261,421.

*To all whom it may concern:*

Be it known that I, VICTOR JEANTY, chemist, a citizen of the Republic of France, residing in Paris, France, have invented certain Improvements in Electric Batteries, (for which I have obtained a French patent, dated November 19, 1896, No. 261,421,) of which the following is a specification.

The main distinguishing feature of the electrical battery which forms the subject of this invention is that its exciting liquid is, chemically speaking, kept separate from the depolarizing liquid, although electrically the electrodes are directly connected, while as regards the relative quantities of the liquids contained in the cells constant and uniform proportions are maintained. This arrangement therefore affords a means for removing the inconveniences attaching to the batteries now in use, comprising porous vessels or jars, whereby the separation of the liquids is effected or wherein such liquids are superposed in an order of succession determined by their density or specific gravity. Besides, current of great intensity and uniformity of tension is obtained at a minimum cost.

In order that my invention may be readily understood, so that there may be no doubt as to its nature, I will hereinafter describe the same in detail with reference to accompanying drawings, in which—

Figure 1 is a sectional perspective view representing, by way of example, a primary battery constructed in accordance with my invention. Fig. 2 is a partial longitudinal section showing the arrangement of the positive or soluble electrode. Fig. 3 is a representation of a modified arrangement for coupling together the constituent parts of the positive or soluble electrode. Fig. 4 is a partial cross-section showing the respective positions of the constituent elements of both the negative or insoluble and positive or soluble electrodes; and Fig. 5 is a partial section of the battery, on an enlarged scale, showing a slightly-different form of negative electrode.

A battery embodying my invention comprises the following parts: A negative or insoluble electrode formed, as shown in Fig. 1, of one or more parallel wires, rods, or laminæ $a\, a'\, a^2\, a^\times$, of copper, carbon, or any other material suited to the nature of the depolarizing liquid employed, such wires, rods, or laminæ being connected and secured in any convenient manner to a copper cross-bar A, serving as a collector, and a positive or soluble electrode formed of one or more parallel wires or laminæ $b\, b'\, b^2\, b^\times$, of zinc or any other metal that may be affected by the exciting liquid employed, such laminæ being connected in any convenient manner to a collector, which may be a transverse rod B, Figs. 1 and 2, similar to the rod or bar A, serving as the first-mentioned collector, or a mercury-bath B', Fig. 3.

The wires, rods, or the like $a\, a'\, a^2\, a^\times$ are placed at the bottoms of troughs $c\, c'\, c^2 c^\times$, respectively, such troughs being of elongated shape, narrow and low, and communicating below, each at one end, through an orifice $x$, with a feeding-reservoir C, to which the said troughs are properly fitted. The troughs and reservoir, forming jointly a connected whole, are constructed of india-rubber, porcelain, glass, polished wood, or any other material being originally or having been made acid-proof, non-conducting, and impervious. The collector A is secured to the receiver C by any suitable means, such receiver C having a false bottom $f$, situated a little distance below the upper edge of the troughs.

The laminæ $b\, b'\, b^2\, b^\times$ of the soluble electrode are interposed, preferably erect, between the troughs mentioned above, so that, as shown in Figs. 4 and 5, their upper edges are level with the tops of the said troughs or a little distance above the same. To this end they rest upon supports $s\, s'$ integral with the troughs or are supported in any other convenient manner.

The whole arrangement is placed in a receiver R, of glass, porcelain, india-rubber, or other acid-proof material, the shape and dimensions of which should be suited to the nature of its contents. The trough-bottoms should be at a predetermined distance from the bottom of the receiver and may, for instance, be carried by feet $p$. Opposite the vessel or chamber C or in any other convenient situation the receiver R may be provided with a partition $r$, which does not reach down to the bottom and in front of which may be situated a compartment $r'$, having an orifice $t$ for the overflow, hereinafter more fully referred to, or instead of such compartment $r'$ discharge-tubes $r^2$, Fig. 3, answering the same purpose, may be provided. Into the supply-reservoir C, I first admit slightly-acidulated water—for instance, dilute sulfuric acid—which, through the perforations $x$, passes into the several troughs, filling them partly or entirely. The acidulated water (which constitutes the exciting liquid) then overflows into the receiver R, so as to come in contact with the positive electrodes. I then place upon the false bottom $f$ of the vessel or reservoir C a depolarizing substance, such as crystallized sulfate of copper. The crystals gradually dissolve, water being added for this purpose, to form the depolarizing liquid, which on passing through the orifices $x$ rises to the level of the rods of the negative electrode. This depolarizing solution little by little displaces the exciting liquid, which eventually occupies only the upper part of the troughs, its loss being compensated for by the water liberated from the sulfate-of-copper crystals, the metal of which settles upon the negative or insoluble electrode. As a result of the action of the acidulated water or exciting liquid upon the bars of the positive or soluble electrode there forms a salt of the metal constituting the electrode—for instance, zinc sulfate—and this salt, while dissolving in the liquid, yet owing to its greater specific gravity descends to the bottom of the receiver R, so that it can in no case enter the impervious troughs containing the depolarizing liquid. The denser portion of the exciting liquid, by passing underneath the partition $r$, enters the compartment $r'$, the overflow escaping through the orifice $t$. Where delivery-tubes $r^2$, Fig. 3, are employed the effect will be identical. Electrical action takes place incessantly, the negative or insoluble electrode being constantly depolarized, while the positive or soluble electrode is acted upon with the utmost regularity, since it dips into a liquid the specific gravity of which continues practically without any variation, owing to the constant discharge of the saturated parts, according as they form. It will thus be seen that this action takes place between the feeding-troughs, the walls of which are entirely impervious, for as the plates or wires of the positive or soluble electrode are level with the said baths, or, indeed, remain below the level of such baths, it follows that the salt which is formed, being of greater specific gravity than the exciting liquid, cannot rise and must fall to the bottom of the receiver R. No mixture of the cupric solution with the salts of zinc, which would form were the latter metal to dissolve, is therefore apt to occur here.

The advantages of a battery of this construction as compared with existing batteries may therefore be described as follows:

First. The absolute separation in the operating-battery of the depolarizing from the exciting liquid, chemically speaking, notwithstanding that the two liquids remain in contact with each other (see Fig. 5) and therefore connected electrically, whereby a mixture of them, as well as secondary reactions of an objectionable character, are avoided. In other words, both the chemicals employed in forming the cell and the reaction products are kept entirely apart, while the electrodes continue in electrical connection through the medium of the liquid, which serves as a vehicle for the depolarizing agent.

Second. The omission of any porous partition which (where it exists) invariably opposes a resistance to the passing current. With my invention the partition is impervious in its entirety and non-conducting, and no current whatever passes through the partition or trough. The entire current passes over the top of the trough through the depolarizing and the exciting liquids and their contacting surfaces.

Third. The utilization to full advantage of the depolarizer employed without loss or waste of any sort, since, however small may be the quantity of liquid contained in the troughs, the rods of the negative or insoluble electrode are yet invariably surrounded by it.

Fourth. A reduction of the expenditure of depolarizing liquid or of the amount of such liquid required to effect depolarization, inasmuch as such liquid is never in the condition of an oversaturated solution.

Fifth. The facility for reducing or increasing at will the internal resistance of the cell, and consequently the amount of "active" substances such cell consumes, by either diluting the exciting liquid more or less or by increasing or reducing the surface of the electrodes.

I desire it to be understood that my improved battery may be made in various sizes and shapes.

It will also be understood that the impervious troughs of which my invention involves the employment may be varied at will in number and in sectional area or outline, and, further, that they may be arranged or combined and supported in any convenient manner, and that they may be of either rectangular or circular shape.

What I claim is—

1. An electric battery, comprising a receiver, an electrode in said receiver, a non-conducting and impervious trough located in the receiver, said trough being closed at the bottom and open at its upper portion, and another electrode in the trough, the upper edge portion of the trough being at approximately the same level with the upper edge of the electrode in the receiver.

2. An electric battery, comprising a supported body of liquid, an electrode in contact with said liquid, an impervious and non-conducting trough located in the said liquid, said trough being closed at the bottom and open at its upper portion below the surface of the liquid and at approximately the same level at which the top of said electrode is located, another electrode in said trough, and another liquid contained in the trough and in contact with the upper strata of the first-named liquid.

In testimony whereof I have signed my name to this specification in the presence of two subscribing witnesses.

VICTOR JEANTY.

Witnesses:
　LÉON FRANCKEN,
　EDWARD P. MACLEAN.